US010805932B2

(12) United States Patent
Serravalle et al.

(10) Patent No.: US 10,805,932 B2
(45) Date of Patent: *Oct. 13, 2020

(54) NETWORK SHARING

(71) Applicant: NEC Corporation, Tokyo (JP)

(72) Inventors: Francesca Serravalle, London (GB); Neeraj Gupta, London (GB); Robert Paterson, London (GB); Satoshi Noma, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/299,624

(22) Filed: Mar. 12, 2019

(65) Prior Publication Data

US 2019/0215839 A1   Jul. 11, 2019

Related U.S. Application Data

(63) Continuation of application No. 15/951,080, filed on Apr. 11, 2018, now Pat. No. 10,278,186, which is a
(Continued)

(30) Foreign Application Priority Data

May 20, 2011   (GB) .................................. 1108525.5

(51) Int. Cl.
*H04W 36/00*   (2009.01)
*H04W 72/04*   (2009.01)
(Continued)

(52) U.S. Cl.
CPC ....... *H04W 72/0486* (2013.01); *H04W 16/14* (2013.01); *H04W 28/08* (2013.01);
(Continued)

(58) Field of Classification Search
CPC ..... H04W 48/02; H04W 48/06; H04W 48/12; H04W 48/10; H04W 76/27; H04W 84/042; H04W 12/08; H04W 48/08
See application file for complete search history.

(56) References Cited

U.S. PATENT DOCUMENTS 9,974,083 B2*   5/2018   Serravalle ............. H04W 16/14
2004/0219912 A1   11/2004   Johansson et al.
(Continued)

FOREIGN PATENT DOCUMENTS

CN   101626590 A   1/2010
EP   1282321 A2   2/2003
(Continued)

OTHER PUBLICATIONS

3GPP TS 32.425 v8.5.0 (Mar. 2011), 3rd Generation Partnership Project; Technical Specification Group Services and System Aspects; Telecommunication Management; Performance Managment (PM); Performance Measurements Evolved Universal Terrestrial Radio Access Network (E-UTRAN) (Release 8) (44 pages).
(Continued)

*Primary Examiner* — Khalid W Shaheed
(74) *Attorney, Agent, or Firm* — Wilmer Cutler Pickering Hale and Dorr LLP

(57) ABSTRACT

A wireless communication system includes one or more base stations able to divide resources between multiple network operators sharing the base station. A shared base station is configured to monitor a contribution to the load on the base station associated with network operators sharing the base station resources and to provide the determined contribution to the load to one or more other base stations for use in load balancing between the base stations.

4 Claims, 4 Drawing Sheets

Related U.S. Application Data continuation of application No. 14/119,061, filed as application No. PCT/JP2012/061930 on May 1, 2012, now Pat. No. 9,974,083.

(51) Int. Cl.
  *H04W 48/10* (2009.01)
  *H04W 16/14* (2009.01)
  *H04W 28/08* (2009.01)
  *H04W 36/22* (2009.01)
  *H04W 88/08* (2009.01)

(52) U.S. Cl.
  CPC .......... *H04W 36/22* (2013.01); *H04W 48/10* (2013.01); *H04W 88/08* (2013.01)

(56) References Cited

U.S. PATENT DOCUMENTS

| | | |
|---|---|---|
| 2005/0213566 A1 | 9/2005 | Jutila et al. |
| 2008/0200146 A1 | 8/2008 | Wang et al. |
| 2009/0046672 A1 | 2/2009 | Malladi et al. |
| 2010/0240338 A1 | 9/2010 | Mallick et al. |
| 2011/0053598 A1 | 3/2011 | Ahluwalia |
| 2011/0141908 A1 | 6/2011 | Ishida et al. |
| 2011/0270984 A1 | 11/2011 | Park |
| 2011/0294508 A1* | 12/2011 | Min ................. H04W 36/0085 455/436 |
| 2012/0051297 A1* | 3/2012 | Lee ..................... H04W 74/006 370/329 |
| 2012/0282930 A1 | 11/2012 | Ahluwalia |
| 2013/0035064 A1 | 2/2013 | Balachandran et al. |
| 2013/0155864 A1 | 6/2013 | Yoshizawa et al. |

FOREIGN PATENT DOCUMENTS

| | | |
|---|---|---|
| EP | 1475980 A1 | 11/2004 |
| EP | 2219408 A2 | 8/2010 |
| EP | 2416605 A1 | 2/2012 |
| JP | 2011-511486 A | 4/2011 |
| WO | WO-02/089513 A1 | 11/2002 |
| WO | WO-2009/096496 A1 | 8/2009 |
| WO | WO-2009/102249 A1 | 8/2009 |
| WO | WO-2010/108540 A1 | 9/2010 |
| WO | WO-2010/121560 A1 | 10/2010 |
| WO | WO-2011/022873 A1 | 3/2011 |

OTHER PUBLICATIONS

3GPP TS 36.331 V8.13.0, 3rd Generation Partnership Project; Technical Specification Group Radio Access Network; Evolved Universal Terrestrial Radio Access (E-UTRA); Radio Resource Control (RRC); Protocol specification (Release 8), 213 pages (Mar. 2011).

3GPP TS 36.413 V10.1.0 (Mar. 2011) Technical Specification, 3rd Generation Partnership Project; Technical Specification Group Radio Access Network; Evolved Universal Terrestrial Radio Access Network (E-UTRAN); S1 Application Protocol (S1AP) (Release 10), 256 pages (Mar. 2011).

Alcatel-Lucent, "Presence of Group ID in the X2 Setup," 3GPP TSG-RAN WG3 #65, R3-091819, Agenda Item 9.4.7, Shenzhen, China, Aug. 24-28, 2009 (4 pages).

Chinese Office Action issued by the State Intellectual Property Office of the People's Republic of China for Application No. 201280024488.0 dated Dec. 29, 2016 (18 pages).

Ericsson, ST-Ericsson, "PLMN identity at handover," 3GPP TSG-RAN WG2 Meeting #66bis, R2-093788, Agenda Item 5.8.1, Los Angeles, USA, Jun. 29-Jul. 3, 2009 (3 pages).

European Office Action issued by the European Patent Office for Application No. 12723946.5 dated Sep. 17, 2015 (5 pages).

Extended European Search Report issued by the European Patent Office for Application No. 16163047.0 dated Jun. 28, 2016 (8 pages).

International Search Report in PCT/JP2012/061930 dated Oct. 16, 2012 (English Translation Thereof) (6 pages).

Japanese Office action corresponding to Japanese Application No. 2013-551448 dated Nov. 12, 2014 with a partial English translation thereof. (5 pages).

Japanese Office Action issued by the Japan Patent Office for Japanese Application No. 2016-028607 dated May 17, 2017 (3 pages).

Japanese Office Action issued by the Japan Patent Office for the Japanese Application No. 2017-156986 dated Jul. 24, 2018 (7 pages).

Japanese Office Action issued in corresponding Japanese Application No. 2015-062488, dated Dec. 24, 2015, 3 pages.

Japanese Office Action issued in Japanese Patent Application No. 2016-028607, dated Dec. 14, 2016, 3 pages.

NEC, "RAN Sharing enhancements," 3GPP Draft; R3-111992_Disc_RAN_Sharing Enhancement, 3rd Generation Partnership Project (3GPP), Mobile Competence Center; 650, Route Des Lucioles; F-06921 Sophia-Antipolis Cedex; FRNACE, vol. RAN WG3, No. Athens, Greece; Aug. 22, 2011, Sep. 9, 2011, XP05041622, the whole document (5 pages).

NTT DoCoMo and T-Mobile "Access Class Barring Enhancements", 3GPP TSG RAN WG2 #62, Tdoc-R2-082628, Kansas City, USA, May 5-9, 2008, 4 pages.

NTT DoCoMo, "Overload protection in network configuration implemented Iu-flex/Network sharing," 3GPP Draft, TSG-SA WG2, Meeting #43, S2-043538, Agenda Item 10.2 ACBOP, Seoul, Korea, 3 pages (Nov. 15-19, 2004).

\* cited by examiner

NETWORK SHARING

CROSS-REFERENCE TO RELATED APPLICATIONS

This application is a continuation of U.S. patent application Ser. No. 15/951,080, entitled "Network Sharing," filed Apr. 11, 2018, which is a continuation of U.S. patent application Ser. No. 14/119,061, entitled "Network Sharing," filed Nov. 20, 2013 (now U.S. Pat. No. 9,974,083), which is a 371 of international PCT/JP2012/061930, entitled "Network Sharing," filed May 1, 2012, which claims the benefit of priority from United Kingdom Patent Application No. 1108525.5, filed on May 20, 2011, the contents of which are incorporated herein in their entireties.

TECHNICAL FIELD

The present invention relates to a radio access network in a cellular or wireless telecommunications network, and particularly but not exclusively to sharing the radio access network between multiple operators. The invention has particular but not exclusive relevance to wireless telecommunications networks implemented according to the LTE standard.

BACKGROUND ART

Radio Access Network (RAN) sharing deployment scenarios are known and methods and abilities to facilitate implementations of these scenarios have been introduced into the 3G standards since Release 5.

RAN sharing provides a way for network operators (service providers) to reduce their capital expenditure requirements and/or widen the area covered by a cellular communication service when setting up a wireless communications network. Rather than each operator having to provide their own base station and associated equipment for each cell of the network, an operator sharing the RAN of another operator is able to provide their service into areas served by the other operator without having to invest in their own base stations in that location.

Furthermore, by reducing the number of base stations that must be provided and operated, the ongoing operating costs can be reduced for the sharing operators. Indeed, each base station may draw a large amount of electricity during operation, and therefore reducing the number of operating base stations may significantly reduce electrical power requirements and may therefore also be considered environmentally friendly.

Typically, sharing of RANs by operators has been a symmetric arrangement in which each operator gets some access to the RAN of the other operator. In the extreme, such an arrangement allows two operators to provide service to the same area with half as many base stations (and therefore with significantly reduced cost) as would be required if no sharing was possible.

RAN sharing is particularly advantageous in areas in which an operator has cell capacity that is underused, as this spare capacity can then be shared with no impact on the original operator's ongoing service provision. Furthermore, RAN sharing may be useful in order to ensure that a service provided by an operator is able to reach a certain percentage of the population, which may be specified by license conditions in some countries, without requiring each operator to install expensive capacity in remote areas in which it is likely to be underutilized.

Currently, the standards relating to RAN sharing are limited to two scenarios. In a first scenario, only the RAN base stations themselves are shared by the different operators. In a second scenario, parts of the core network, for example the Evolved Packet Core (EPC) in LTE, can be shared as well as the RAN base stations, further decreasing capital expenditure costs in setting up the network. In each case, sharing of the RAN can be arranged to use split frequencies, in which each operator sharing the RAN has allocated (different) frequency ranges, or may use common frequencies in which the full range of frequencies is available for use by either operator.

The mechanisms for sharing of RANs may also be useful in the case of mergers of operator companies, allowing the two operators to merge their network services without any significant interruptions in service provision.

To date, it has always been the case that the network provider that makes the RAN available for sharing has been one of the service providers, or operators, sharing the network. However, the inventors have realised that in future this may not always be the case. In particular, in some cases it is possible that a specialist network provider may install network capacity that can then be used by unrelated service providers.

The recent economic situation has provided further impetus for network operators to reduce costs, and therefore increased the trend to share networks with other operators. In particularly, network operators are increasingly considering the scenario in which the owner of the network is not themselves a service provider. In this case, each service provider, or operator, will purchase a share in the capacity of the network. This may be based on their respective holding of frequency licenses in the relevant spectrum.

The first arrangement in which a number of network operators will rely on a third party network provider to provide a shared access network has now been proposed. However, there remain a number of issues to be addressed in the standards to enable this scenario of RAN sharing to be implemented.

For example, in order to enable this new RAN sharing scenario, it is important that the standard provides ways to guarantee fair usage of the network resources by each of the network operators according to their share in the RAN. Each network operator must be able to monitor the network performance to ensure that service level agreements are met and to identify any potential problems. Furthermore, each network operator must be able to operate their share of the network in a way that provides complete access to all existing features defined in the standards.

The ability for network operators sharing capacity in a communication network to monitor the network performance in a shared RAN is also useful in enforcing sharing agreements when one of the operators is also the owner of the shared RAN and/or when the network operators are assigned different proportions of the network resources (i.e. unequal shares).

SUMMARY

Embodiments of the invention aim to at least partially address some of the problems with the prior art described above.

According to an aspect of the invention, there is provided a base station operable to share resources between at least two network operators, the base station comprising means for determining a contribution to a load on the base station associated with a one of the network operators, and means for providing the determined contribution to the load on the base station associated with the one network operator to a further base station for use in load balancing between the base stations.

The network operators may operate independent Public Land Mobile Networks (PLMN) and be associated with a unique PLMN id value used to identify a respective PLMN.

The base station may further comprise means for receiving from the further base station contributions to the load on the further base station associated with each network operator.

The base station may further comprise means for determining if the contribution to the load for the one network operator is above a threshold load for that network operator, and means operable, in response to determining that the contribution to load is above the threshold level for that network operator, to cause at least one connection associated with the one service provider to be handed over to the further base station. The means operable to cause at least one connection to be handed over may only do so if such a handover does not overload the further base station. The base station may further comprise means for communicating an available capacity associated with each network operator on the base station to the further base station.

According to a further aspect of the invention, there is provided a base station operable to share resources between at least two network operators, the base station comprising means for receiving a message from a further base station, the message comprising information relating to a contribution to a load on the further base station associated with a one of the network operators, and means for performing load balancing between the base station and the further base station based on the received information.

The means for performing load balancing may be configured to adjust a handover trigger level associated with the one network operator, the handover trigger level being used to control handover of connections associated with the one network operator between the base station and the further base station. The means for receiving may comprise an X2 network interface for communication using the X2 interface between base stations.

According to a further aspect of the invention, there is provided a base station operable to share resources between at least two network operators, the base station comprising means for handing over a connection associated with one of the at least two network operators between the base station and another base station based on a handover trigger level associated with the one network operator, and means for adjusting handover trigger levels independently for each network operator.

The means for adjusting the handover trigger levels may be configured to adjust the handover trigger levels in dependence on a contribution to load on the base station for each network operator. The base station may further comprise means for receiving information from a neighbouring base station relating to a contribution to load on the neighbouring base station for each network operator, wherein the means for adjusting the handover trigger levels are further configured to adjust the handover trigger levels in dependence on the contribution to load on the neighbouring base station for each network operator.

According to a further aspect of the invention, there is provided a base station operable to share resources between at least two network operators, the base station comprising means for determining a contribution to load on the base station associated with a one of the at least two network operators, and means for transmitting a request to a further base station to advance or delay handover of connections associated with the one network operator from the further base station to the base station based on the determined contribution to load.

The request may comprise a mobility change request message. The means for transmitting may be further configured to transmit a request to delay handover of connections associated with the one network operator when it is determined that the load associated with the one network provider is above a threshold load level. The means for transmitting may be further configured to transmit a request to advance handover of connections associated with the one network operator when it is determined that the load associated with the one network provider drops below a threshold load level.

According to a further aspect of the invention, there is provided a base station operable to share resources between at least two network operators, the base station comprising means for receiving a request to advance or delay handover of connections associated with a one of the network operators from the base station to a further base station, and means for adjusting one or more handover parameters associated with the one network operator based on the received request.

According to a further aspect of the invention, there is provided a mobility management entity for use in a wireless communication network configured to share core network capacity between at least two network operators, the mobility management entity comprising means for communicating for at least one of the network operators an available capacity at the mobility management entity for that network operator to at least one base station.

The means for communicating may be further configured to communicate the available capacity for each network operator to the at least one base station in a Relative MME Capacity information element per PLMN id value.

According to a further aspect of the invention, there is provided a base station for use in a wireless communication network configured to share core network capacity between at least two network operators, the base station comprising means for receiving information relating to an available core network capacity associated with one of the network operators, and means for generating a new connection request associated with the one network operator based on the received information. The new connection request is, of course, also generated based on a connection request that is received from a mobile communication device.

The information relating to available core network capacity may comprise information relating to available capacity at a mobility management entity shared by the at least two network operators.

The means for generating a new connection request for a particular network operator may be further configured to select a mobility management entity from a plurality of mobility management entities to register the new connection based on the available core network capacity for the particular network operator associated with the mobility management entities.

According to a further aspect of the invention, there is provided a mobility management entity for use in a wireless communication network configured to share core network capacity between at least two network operators, wherein each network operator is assigned a proportion of a capacity of the mobility management entity, the mobility management entity comprising means for determining if an overload condition has been reached at the mobility management entity based on a load on the mobility management entity, and means operable, in response to determining an overload condition has been reached, to determine if a one of the network operators is exceeding the proportion of the capacity of the mobility management entity assigned to the one network operator, and if so to transmit a message to a base station indicating that new connection requests associated with the one network operator should be rejected or routed through another mobility management entity.

The message transmitted to the base station may comprise a MME Overload Start message associated with the one network provider.

The mobility management may further comprise means operable to determine whether the one network operator is no longer exceeding the proportion of the capacity assigned to that network operator and, if so, to transmit a further message to the base station indicating that new connection requests associated with that network operator may be accepted.

The further message may comprise a MME Overload Stop message associated with the one network provider.

According to a further aspect of the invention, there is provided a base station for use in a wireless communication network configured to share core network capacity between at least two network operators, the base station comprising means for receiving a message from a mobility management entity indicating that new connection requests associated with a one of the network operators should be rejected or routed through another mobility management entity, and means operable to reject new connection requests associated with the one network operator or to route new connection requests associated with the one network operator through another mobility management entity, in response to receiving the message.

According to a further aspect of the invention, there is provided a method of providing information for use in balancing a network load between a base station and a neighbouring base station, wherein the capacity of the base station is shared between at least two network operators, the method comprising determining a contribution to a load on the base station associated with a one of the network operators, and providing the determined contribution to the load on the base station associated with the one network operator to the neighbouring base station for use in load balancing between the base stations.

According to a further aspect of the invention, there is provided a method of balancing a load between a base station and a neighbouring base station, wherein the capacity of the base station is shared between at least two network operators, the method comprising receiving a message from the neighbouring base station, the message comprising information relating to a contribution to a load on the neighbouring base station associated with a one of the network operators, and performing load balancing between the base station and the neighbouring base station based on the received information.

Performing load balancing may further comprise performing load balancing for connections associated with the one network operator based on the received information independently of any load balancing for connections associated with any other of the network operators.

According to a further aspect of the invention, there is provided a method of controlling handover at a base station shared between at least two network operators, the method comprising adjusting handover parameters used to control handover independently for each network operator sharing the base station, and handing over a connection associated with a one of the network operators between the base station and a neighbouring base station based on a handover parameter associated with the one network operator.

According to a further aspect of the invention, there is provided a method of load balancing between a base station and a neighbouring base station, wherein the base station is shared between at least two network operators, the method comprising determining a contribution to load on the base station associated with a one of the at least two network operators, and transmitting a request to the neighbouring base station to advance or delay handover of connections associated with the one network operator from the neighbouring base station to the base station based on the determined contribution to load.

According to a further aspect of the invention, there is provided a method of load balancing between a base station and a neighbouring base station, wherein the base station is shared between at least two network operators, the method comprising receiving a request to advance or delay handover of connections associated with a one of the network operators from the base station to the neighbouring base station, and adjusting a handover parameter associated with the one network operator based on the received request.

According to a further aspect of the invention, there is provided a method comprising communicating, for at least one network operator, an available capacity at a mobility management entity for that network operator to at least one base station, wherein the capacity of the mobility management entity is shared between at least two network operators.

According to a further aspect of the invention, there is provided a method of generating a new connection request at a base station in a wireless communication network configured to share core network capacity between at least two network operators, the method comprising receiving information relating to an available core network capacity associated with one of the network operators, and generating a new connection request for a connection associated with the one network operator based on the received information.

According to a further aspect of the invention, there is provided a method of controlling admittance of new connection requests in a wireless communication network configured to share core network capacity between at least two network operators, the method comprising determining if an overload condition has been reached at a mobility management entity in the core network based on a load on the mobility management entity, and in response to determining that an overload condition has been reached, determining if a one of the network operators is exceeding a proportion of the capacity of the mobile management entity assigned to the one network operator and, if so, transmitting a message to a base station indicating that new connection requests associated with the one network operator should not be routed through the mobility management entity.

According to a further aspect of the invention, there is provided a method of controlling admittance of new connection requests in a wireless communication network configured to share core network capacity between at least two network operators, the method comprising receiving at a base station a message indicating that new connection requests associated with a one of the network operators should be rejected, and rejecting new connection requests associated with the one network operator at the base station.

According to a further aspect of the invention, there is provided a base station operable to share resources between at least two network operators, the base station comprising means for determining resource usage of the base station associated with a one of the network operators, and means for managing the rate of incoming connection requests associated with the one network operator in dependence upon the determined resource usage.

In one embodiment, the determined resource usage is compared with a threshold value and the means for managing the rate of incoming connection requests is arranged to reduce the rate of incoming connection requests if the determined resource usage is above the threshold. This may be achieved, for example by blocking one or more new connection requests associated with the one network operator.

In a preferred embodiment, the base station may be further configured to broadcast an indication that new connections associated with the one network operator are blocked in response to the determined resource usage being greater than the threshold, and/or to set an ac-Barring information element for the one network operator.

According to a further aspect of the invention, there is provided a method of controlling the sharing of resources on a base station that is shared between at least two network operators, the method comprising determining a contribution to a load on the base station associated with a one of the network operators, and blocking a new connection associated with the one network operator in response to the determined contribution to the load.

The invention provides, for all methods disclosed, corresponding computer programs or computer program products for execution on corresponding equipment, the equipment itself (user equipment, nodes or components thereof) and methods of updating the equipment.

BRIEF DESCRIPTION OF THE DRAWINGS

An exemplary embodiment of the invention will now be described, by way of example, with reference to the accompanying drawings in which.

DETAILED DESCRIPTION OF EXEMPLARY EMBODIMENTS

Overview

Figure 1:
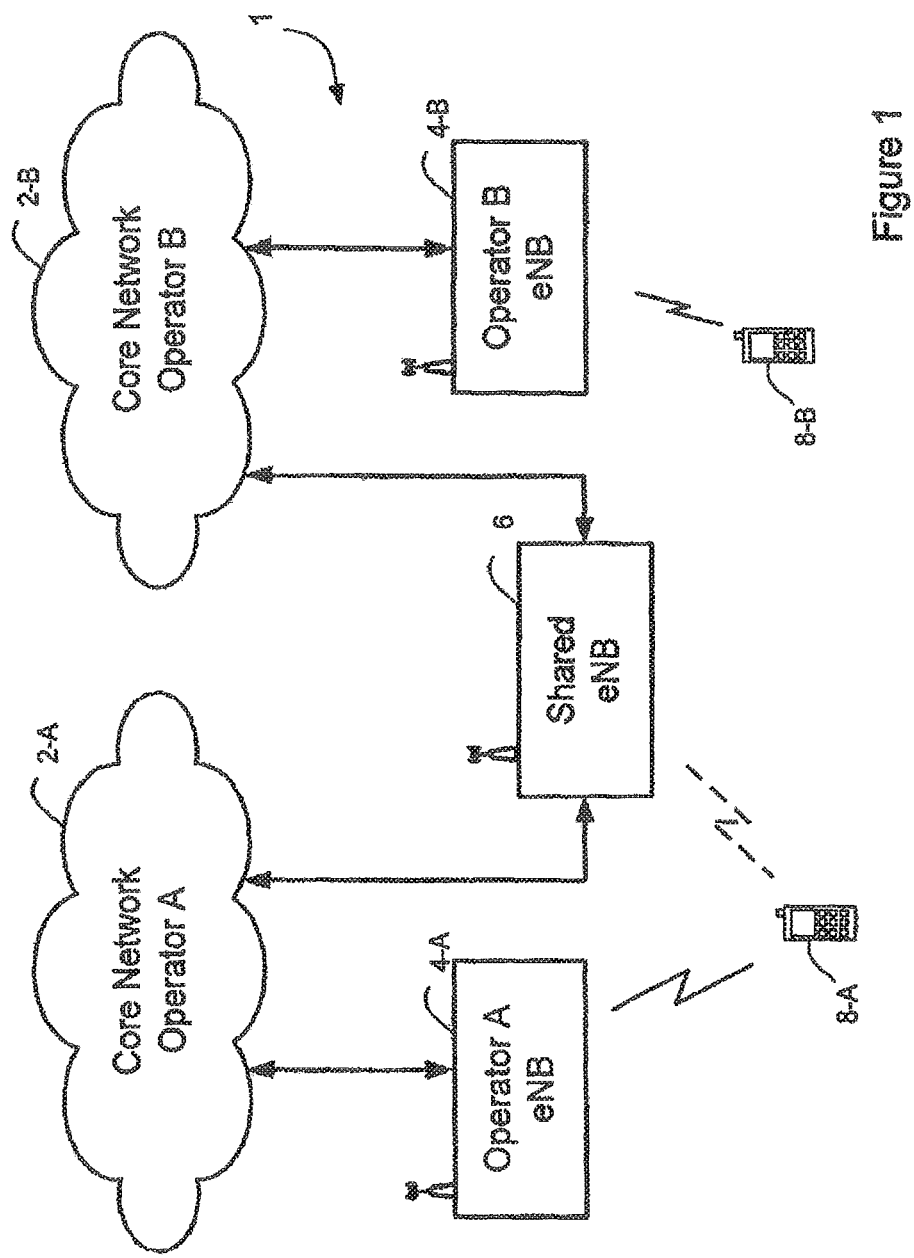
FIG. 1 schematically illustrates a mobile telecommunication system of a type to which the invention is applicable.

FIG. 1 schematically illustrates a mobile (cellular) telecommunication system 1 in which two network operators, operators A and B, are able to provide a mobile wireless communications service. Operator A has a core network 2-A and operator B a core network 2-B. Each operator may also provide one or more base stations or eNBs 4-A, 4-B as part of a radio access network (RAN) for allowing one or more mobile telephones, or user equipments, 8-A, 8-B to connect to their network and receive the service. As will be understood by those skilled in the art, each base station 4 operates one or more base station cells in which communications can be made between the base station 4 and the mobile telephones 8. For an eNB 4 associated with an operator, such as eNB 4-A associated with operator A, typically only mobile telephones 8-A associated with the relevant operator are able to connect and interact with the wireless communication system via that eNB 4-A. Thus, only mobile telephones 8-A configured to access services via service provider A are able to connect to the network via operator A's eNB 4-A without "roaming" away from their home network.

The telecommunications system 1 further includes shared eNB 6. Operators A and B agree to share in the capacity of the shared eNB 6 such that both a mobile telephone 8-A associated with operator A and a mobile telephone 8-B associated with operator B are able to connect to the network via the shared eNB 6 as though connecting through equipment provided by their own respective network operator. Thus, mobile telephone 8-A may connect or handover to the shared eNB 6 as though the shared eNB 6 is an eNB associated with operator A, while mobile telephone 8-B is able to connect to shared eNB 6 as though the shared eNB 6 is an eNB associated with operator B.

Such an arrangement may be useful in areas of low population density, or more generally areas having low bandwidth requirements, in order to allow both network operators to provide their service to that area without requiring both network operators to install their own RAN in that area. In contrast, in areas with higher capacity requirements the network operators may choose to install their own RANs rather than sharing capacity.

The shared base station (eNB) 6 can be connected to by mobile telephones 8 associated with either of the network operators A or B that share the base station 6, as though that base station 6 was a base station belonging to the respective network operator. It is noted that this is quite different to a mobile telephone associated with a first network operator forming a connection via the network of a different service provider using the "roaming" mechanism.

In a roaming situation, the connection with the mobile telephone is monitored and controlled by the visited network which then subsequently bills the home network of the mobile telephone (generally at significantly increased cost). In contrast, the sharing of the radio access network, as in the current embodiment, is transparent to users of the network, and monitoring and control of connections is performed using standard mechanisms as though the mobile telephone was connected via the network operator's own RAN.

Each operator's network is typically associated with a unique PLMN (Public Land Mobile Network) id value, which is used in the wireless communication network to identify connections associated with a particular network operator. Typically, the network operators will contract to be provided with a certain proportion of the resources available at the shared base station. For security reasons, connections relating to a particular network operator may be isolated from connections relating to other network operators based on the PLMN id value associated with each connection.

In order to monitor the use of network resources by each network operator, monitoring statistics are individually collected for network traffic labelled with each PLMN id in use at the base station. Embodiments of the present invention are able to use the monitoring statistics collected on a per PLMN id basis (ie on a per network operator basis) to allow network functions to be performed for each network operator at a shared base station independently of other network operators at the shared base station. For example, and as will be described in more detail below, the collected statistics may be used to provide load balancing between neighbouring base stations for each network operator.

Shared Base Station (eNB)

Figure 2:
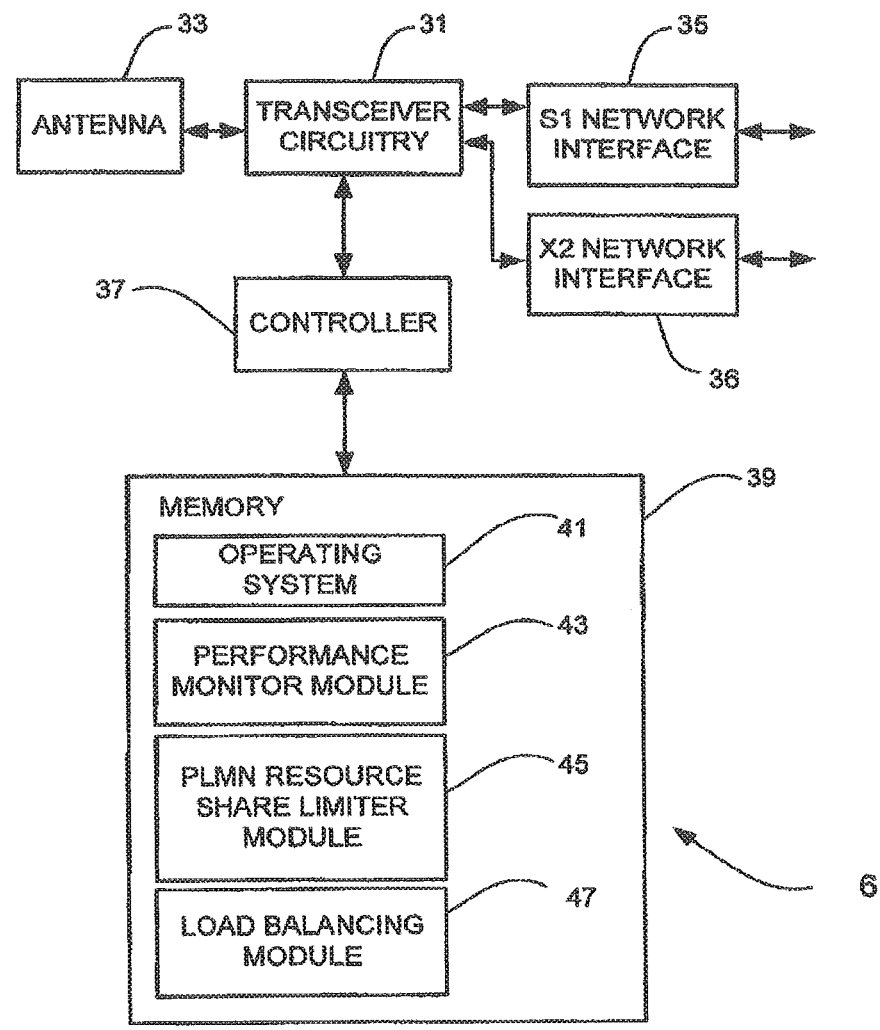
FIG. 2 is a block diagram of a shared base station suitable for use in the telecommunications networks of FIG. 1.

FIG. 2 is a block diagram illustrating the main components of the shared base station 6 shown in FIG. 1. As shown, the shared base station 6 includes transceiver circuitry 31 which is operable to transmit signals to and to receive signals from the mobile telephones 8 via one or more antennae 33 and which is operable to transmit signals to and to receive signals from the core networks 2 via an S1 network interface 35, and also operable to communicate with other base stations using an X2 interface 36. A controller 37 controls the operation of the transceiver circuitry 31 in accordance with software stored in memory 39. The software includes, among other things, an operating system 41, a performance monitor module 43, a PLMN resource share limiter module 45, and a load balancing module 47. The performance monitor module 43 is configured to monitor performance counters on a per PLMN id basis, such that the performance counters are monitored separately for each network operator sharing the capacity of the base station 6. Similarly, the PLMN resource share limiter module 45 and the load balancing module 47 are configured to operate on a per PLMN id basis to ensure that service level limits are enforced and to control load balancing for each network operator respectively.

Usage Control

To allow the performance of the network to be monitored, a range of performance measurement counters are provided by the performance monitor module 43. In the case of a shared RAN in which the sharing operators may contract to be provided with a certain service level, it becomes more important to monitor the performance of the network in order to prove that the service level agreements are being satisfied. In particular, it is necessary to be able to monitor the usage of the shared network by each operator to ensure that network resources are shared fairly. As mentioned above, each operator's network will typically be associated with a PLMN id value which can be used to identify the operator associated with a connection. Thus, according to embodiments of the present invention, the performance measurement counters are defined per PLMN id. For example, counters monitored in the performance monitor module 43 for each PLMN id sharing the network include:

Counters useful for the planning and network re-dimension on a per PLMN id basis
including counters that count the number of RRC Connections (Request, re-establishment) and E-RAB related procedures (Setup, Release and modify).

Counters related to the resource utilization on a per PLMN id basis
including measuring usage of physical resource blocks (PRBs), usage of random access channels, throughput related measurements (on IP layer as well as PDCP), active UE measurements etc.

Counters useful for optimization activity on a per PLMN id basis
including counting the number of handover procedures taking place (including intra frequency, inter frequency, inter RAT handovers, etc.)

In this embodiment, the base station 6 monitors the resources used by each network operator sharing the base station 6 against a service level agreement for that service provider. This monitoring is performed by the performance monitor module 43 as discussed above. The performance monitor module 43 provides the monitored information to the PLMN resource share limiter module 45 which stores agreed usage limits for each PLMN defining the proportion of the capacity at the base station 6 assigned to each PLMN, and compares the resources used by each PLMN id with the stored usage limits. Thus, whenever a PLMN is determined to have reached a maximum level of contracted resource usage, the PLMN resource limiter module 45 will block further connection requests associated with that PLMN id for example by setting a barring flag in a memory to indicate that connection requests associated with a certain PLMN id should be refused. Instead of blocking all connection requests, the PLMN resource limiter module 45 may just block some new connection requests (for example 50%) associated with a PLMN id. In this way, the rate of incoming connection requests is controlled independently for each PLMN.

According to some embodiments, the barring is achieved by setting an ac-barring information flag (for example, the ac-BarringInfo IE or the ac-BarringFactor IE or the ac-BarringTime IE) associated with the PLMN id in system information block 2 (SIB2). The SIB2 is then broadcast throughout the cell area associated with the base station, including the information relating to the barring of new connections for each PLMN to indicate to any incoming mobile telephone 8 whether they may connect to the base station based on their associated PLMN. Any incoming mobile telephones will receive the broadcasted SIB2 and be able to determine whether they will be allowed to connect to the base station 6 based on their associated PLMN id and the barring information per PLMN included in the SIB2.

Load Balancing

In this embodiment, the shared base station 6 is able to communicate with other neighbouring base stations (shared or non-shared) using the X2 interface 36. This allows certain network operations to be performed between base stations 6, reducing the load on core network entities such as a mobility management entity. One of these network operations includes load balancing between neighbouring base stations 6, as provided by the load balancing module 47.

In this embodiment, the load balancing modules 47 in the respective base stations take into account cell loading contributions for each PLMN sharing the capacity of the base station 6. To do this, the load balancing module 47 shares cell loading information (for each PLMN id) with neighbouring base stations 4, 6 so that they can perform load balancing operations in order to balance out the load from the different PLMNs sharing the available resources of the shared base stations 6. This sharing may be performed in response to a specific request for the information from another base station (for example using Resources Status Request/Report messages) or it may be reported to the neighbouring base stations from time to time or on a regular basis. Thus, even if a shared base station 6 is not at full capacity, the load balancing module 47 may still attempt to transfer some mobile telephone connections associated with one PLMN to another base station 4 or 6 or it may receive mobile telephone connections associated with a PLMN from another base station 6. Two example scenarios will now be described that illustrate this "per PLMN" load balancing operation.

Scenario 1

In this scenario, a first base station cell has a network load of 50% and all of this load is being contributed by mobile telephone connections associated with a first network operator (PLMN 1), while no load is being placed on the first cell by mobile telephone connections associated with a second network operator (PLMN 2). A second base station cell has a network load of 80%, of which PLMN 1 contributes 30% to this load and PLMN 2 contributes the remaining 50%.

In this scenario, there is a clear imbalance of network resource usage from the two PLMNs. In order to correct this, an enhanced load balancing method is used in the load balancing module 47 that takes into account the contribution to the total load on each base station cell from each PLMN. According to this enhanced method, the load balancing modules 47 in the two base station cells exchange information relating to the load contribution associated with each PLMN id sharing the corresponding base station cell. Thus the load balancing module 47 in the first base station cell informs the load balancing module 47 in the second base station cell that its network loading is 50% and that this is all associated with PLMN 1. Similarly, the load balancing module 47 in the second base station cell informs the load balancing module 47 in the first base station cell that its network loading is 80%, of which PLMN 1 contributes 30% and PLMN 2 contributes 50%.

As the second base station cell has the highest overall load, in accordance with normal load balancing rules, the second base station cell determines from the shared loading information that it should offload some connections to the first base station cell. However, the second base station cell can see from the shared loading information that the capacity being used by PLMN 1 on the first base station cell is already high, and therefore, the load balancing module 47 of the second base station cell transfers (wherever possible) connections associated with PLMN 2 (and not those associated with PLMN 1) to the first base station cell. The load balancing module 47 in the second base station cell can achieve this, for example, by reducing a handover trigger level for mobile telephones associated with PLMN 2 (whilst maintaining or increasing the handover trigger level for mobile telephones associated with PLMN 1). As those skilled in the art will appreciate, the handover trigger level depends on a number of different parameters (such as hysteresis values, frequency offsets, cell offsets, time-to-trigger and the like) and any one or more of those parameters can be varied to effect the desired change in the handover trigger level and/or timing for mobile telephones associated with a PLMN.

In particular, during normal operation, mobile telephones 8 report details of other base station cells in their vicinity to their currently serving base station cell. The mobile telephone 8 uses the handover parameters mentioned above to determine trigger conditions for sending the Measurement Report (MR) and the base station initiates a handover when it receives the MR. These reports include, among other things, signal strengths for signals received from those other base station cells. When the mobile telephone 8 moves further away from the currently serving cell and closer to another cell, the serving cell can detect this by comparing the signal measurement reports received from the mobile telephone. If the measured signal strength associated with another cell is greater than the handover trigger level, then that mobile telephone may be handed over to that other cell (although other reasons may actually prevent that from happening). Consequently, by assigning different handover trigger levels to the different PLMNs (in each base station cell) and by lowering the trigger level used for mobile telephones associated with PLMN 2 in the second base station cell, the handover module 47 in the second base station cell can increase the number of mobile telephones associated with PLMN 2 that will be transferred to the first base station cell. Simultaneously, the load balancing module 47 in the second base station cell may propose to the load balancing module 47 in the first base station cell (or the load balancing module 47 in the first base station cell may determine by itself from the shared loading information) to delay handover of connections associated with PLMN 2 to the second cell (which can be achieved, for example, by increasing the handover trigger level it uses for PLMN 2).

Thus, the load balancing modules 47 in the respective base station cells act to try to equalize the loads on the two base stations and also to try to equalize the contributions made by each PLMN to the load on each base station.

Scenario 2

In a second scenario, the load on the first cell remains 50% entirely contributed by the first network PLMN 1. However, in this case, the load on the second base station is also 50% with the contributions to the load being split evenly between PLMN 1 and PLMN 2 with each contributing 25% of the cell load.

As the two cells have the same overall loading of 50%, existing load balancing algorithms would not apply any load balancing actions between the cells. However, taking into account the contribution to cell load from each PLMN sharing the capacity, it is clear that there is an imbalance in the usage of cell resources. Thus, having exchanged information on cell load per PLMN id, one or more of the following load balancing actions may be taken by the respective load balancing modules 47 in the cells:

Connections associated with PLMN 1 can be offloaded from the first base station cell to the second base station cell (i.e. reduce the handover trigger level for PLMN 1 used in the first base station cell)

The load balancing module 47 in the first base station cell can signal the load balancing module 47 in the second base station cell with a mobility change request to propose that the second cell delays handover of connections associated with PLMN 1 towards the first cell Handover of PLMN 2 connections from the first cell to the second cell may be delayed (for example by increasing the handover trigger level associated with PLMN 2 used by the load balancing module 47 in the first cell)

The load balancing module 47 in the first base station cell may signal the load balancing module 47 in the second base station cell with a mobility change request to propose that the second cell advances handover of PLMN 2 connections towards the first cell.

Thus, in accordance with this embodiment, load balancing is provided on a per PLMN id basis for the shared base stations 6.

In addition, neighbouring base stations 6 preferably also inform each other of any service level loading limits associated with each PLMN (i.e. an available capacity per PLMN id), so that any load balancing performed does not contravene those limits. For example, in the second scenario above if PLMN 1 has a defined loading limit of 25% on the second base station cell, then connections associated with PLMN 1 can't be offloaded from the first base station cell to the second base station cell as this will contravene the service level agreement limits. Typically, these service level limits will be shared amongst the base station cells during an X2 setup procedure or during a base station configuration update.

Thus, the following changes in the load balancing module 47 may be present over prior art arrangements:

The X2 Setup/eNB Configuration Update message is modified to include physical resource block usage/available capacity Information Element (IE) per PLMN id in both Request and Response messages.

Resources Status Request/Report messages used to communicate information on base station resource status between base stations are modified to provide information on a per PLMN id granularity.

The Mobility Change Request procedures may be modified such that the PLMN id is included in the Request to inform the base station cell that is less loaded to delay the handover of mobile telephones of a certain PLMN (i.e. the PLMN which is using most of the resources of the overloaded base station).

Shared MME

Figure 3:
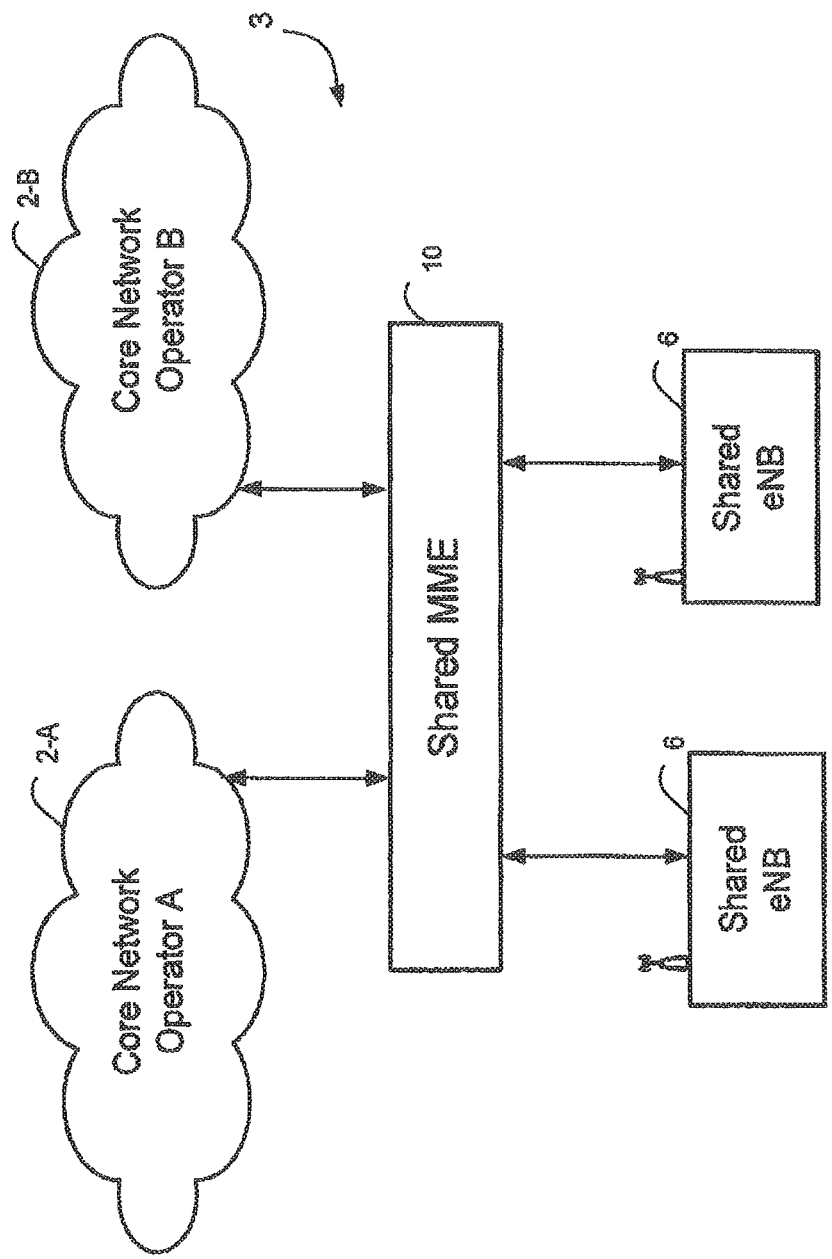
FIG. 3 schematically illustrates a mobile telecommunications system including shared core network components.

FIG. 3 schematically illustrates a communications system 3, according to a further embodiment of the invention, in which elements of the core network 2 are also shared together with the radio access network components in a specific area. In this case, a number of shared base stations 6 are coupled to a shared mobility management entity (MME) 10. The shared base stations 6 shown in FIG. 3 are similar to those described above with respect to FIGS. 1 and 2. The shared MME 10 is then coupled to the core network 2-A of operator A and the core network 2-B of operator B, in order to be able to route connections made via the shared infrastructure to the correct network.

In the embodiment of FIG. 3, the different network operators as represented by the different PLMN ids, share the capacity of not just the shared base stations, but also the mobility management entity 10. In order to facilitate this sharing of the MME 10, a mechanism is provided for exchanging information relating to the capacity assigned to each PLMN id between the shared mobility management entity 10 and one or more of the shared base stations 6. As described in more detail below, the capacity information per PLMN id can be used in selecting a MME when forming a new connection in the network, and also to avoid overloading of the shared MME by a subset of the network operators.

Figure 4:
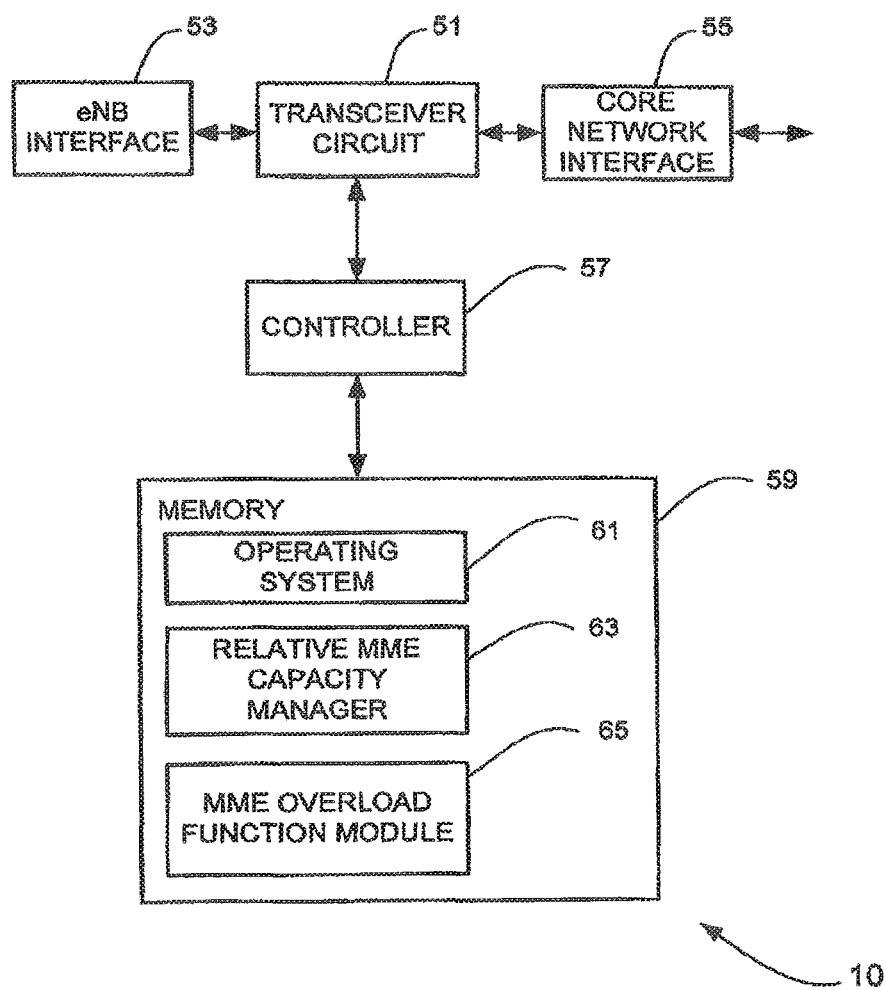
FIG. 4 is a block diagram of a shared mobility management entity suitable for use in the telecommunications network of FIG. 3.

FIG. 4 is a block diagram illustrating the main components of the shared MME 10 shown in FIG. 3. As shown, each shared MME 10 includes transceiver circuitry 51 which is operable to transmit signals to and to receive signals from the shared base stations 6 via eNB interface 53 and which is operable to transmit signals to and to receive signals from the core networks 2 via core network interface 55. A controller 57 controls the operation of the transceiver circuitry 51 in accordance with software stored in memory 59. The software includes, among other things, an operating system 61, a relative MME capacity manager 63 and a MME overload function module 65. The relative MME capacity manager 63 stores information relating to the proportion of the network capacity provided by the MME that has been assigned to each PLMN, and is operable to distribute this information to the shared base stations 6 connected to the MME 10 as discussed in greater detail below. The MME overload function module 65 is activated when the load on the MME 10 is high (for example above a threshold load) and in danger of affecting network operation, and is operable to instruct the shared base stations 6 connected to the MME 10 to refuse new connections to avoid placing further load on the MME in dependence on the capacity assigned to each PLMN.

When a mobile telephone attaches to the network, the connection is routed to core network entities by the base station 6 based on capacity in the core network. In particular, the NAS Node Selection Function allows selection of a mobility management entity (MME) from one of a number of available MMEs in the core network with which to register the mobile telephone. Currently, the available capacity for each MME is provided to the base station 6 by the relative MME capacity manager 63 using the relative MME capacity information element in a S1 setup response message. However, in the prior art systems, this information relates to the entire capacity of the MME and takes no account of a capacity assigned to one or more PLMNs sharing the MME.

However, in this embodiment, the capacity of the MME 10, and other parts of the core network, are shared between the different network operators (PLMNs) associated with different PLMN id values. Thus, in order to correctly route a new connection, the base station 6 needs to be aware of the MME capacity for each PLMN id sharing the capacity of the MME 10.

The relative MME capacity manager 63 of the shared MME 10 is configured to provide a relative MME capacity information element for each PLMN id that shares the capacity of the MME which informs the base station 6 of the available capacity for each PLMN at the MME 10. The base stations 6 will receive similar information from all the MMEs and this allows the base stations 6, to perform the NAS Node Selection Function to select an MME 10 to use when forming a new connection based the PLMN id of the new connection and on the capacity per PLMN id at each of the different MMEs 10. Thus, the base stations 6 are provided with information to select a shared MME with available capacity for a specific PLMN to route the new connection associated with that PLMN.

Furthermore, if a specific PLMN approaches or exceeds its assigned capacity at an MME 10, then it is important that that specific PLMN is not able to use more capacity than has been assigned to it, at the expense of the remaining PLMNs. However, if the capacity being used by other PLMNs at the MME 10 is relatively low, then the over use of the assigned capacity by this PLMN may be accepted.

The MME overload function 65 is operable to detect when the load on the MME approaches overload conditions, and to instruct connected base stations 6 to avoid placing any further load on that MME 10. In the present embodiment, in which different PLMNs have specific assigned capacities, the MME overload function 65 takes into account the PLMN id associated with network traffic at the MME. In particular, the MME overload function 65 indicates to the base station 6 that incoming traffic associated with a particular PLMN should be rejected (or at least not routed through that MME) when capacity available for that PLMN is exceeded.

For example, if two networks have contracted to share the capacity of the shared core network equally (i.e. each contracted a service level of 50%) and the MME 10 reaches a high processing load triggering the MME Overload function 65, the MME should determine how each network is contributing to the load on the MME 10. If it determines that PLMN 1 is using most of the resources in the MME 10, then the MME overload function module 65 will indicate to the base station 6 that new requests associated with PLMN 1 should be rejected, while new requests associated with PLMN 2 may be admitted.

If the situation subsequently changes such that the two networks are contributing equally to the overload on the MME 10, the MME overload function 65 will indicate that new requests associated with either PLMN 1 or PLMN 2 should be rejected. To facilitate this selective control according to PLMN id, an information element comprising a list of requesting PLMNs is included in MME Overload Start and MME Overload Stop messages sent by the MME 10 to connected base stations 6 in order to provide the indications to reject new calls to the base stations.

In the above description, the shared base station 6, and the shared MME 10 are described, for ease of understanding, as having a number of discrete modules (such as the performance monitor module 43, the PLMN resource share limiter module 45, the load balancing module 47, MME overload function module 65 etc.). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities.

Modifications and Alternatives

A number of detailed embodiments have been described above. As those skilled in the art will appreciate, a number of modifications and alternatives can be made to the above embodiments whilst still benefiting from the inventions embodied therein. By way of illustration only a number of these alternatives and modifications will now be described.

While the above described embodiments have been limited to two network operators sharing capacity at a base station or in the core network, it will be appreciated that three, four, or more network operators may share parts of the network, and that the described embodiments are equally applicable to networks shared by more than two operators.

In the above embodiment, a mobile telephone based telecommunications system was described. As those skilled in the art will appreciate, the techniques described in the present application can be employed in any communications system. In the general case, the base stations and the mobile telephones can be considered as communications nodes or devices which communicate with each other. Other communications nodes or devices may include access points and user devices such as, for example, personal digital assistants, laptop computers, web browsers, etc.

In the above embodiments, a number of software modules were described. As those skilled will appreciate, the software modules may be provided in compiled or un-compiled form and may be supplied to the base station or the MME as a signal over a computer network, or on a recording medium. Further, the functionality performed by part or all of this software may be performed using one or more dedicated hardware circuits. However, the use of software modules is preferred as it facilitates the updating of the base station and the MME in order to update their functionality. Similarly, although the above embodiments employed transceiver circuitry, at least some of the functionality of the transceiver circuitry can be performed by software.

The above embodiments have described a number of techniques in which control actions are performed based on a per PLMN basis. As those skilled in the art will appreciate, these different techniques can be performed separately or together. For example the above described load balancing between base stations can be performed with or without the above described techniques for avoiding overload at the MMEs.

In the above embodiments, a contribution to the load on a shared network device associated with a particular PLMN was determined, and if the load was high, various different techniques were used to reduce the load. As those skilled in the art will appreciate, different techniques can be used to determine whether or not the load is high. One technique is to compare the determined load with a threshold value representative of a high load. Alternatively, the determined load may be used to address a look up table that defines the appropriate action to take based on the determined load (which is analogous to comparing the load with a number of different thresholds). In this case, each defined range of loads of the look up table would specify, for example, a different factor to be used to control acceptance of new connections associated with the PLMN or to control handover of existing connections associated with the PLMN to another base station etc.

Various other modifications will be apparent to those skilled in the art and will not be described in further detail here.

Introduction

RAN sharing deployment scenarios have already been popular since quite some time and standard means to allow these scenarios have been introduced since Rel 5. However discussion on RAN sharing standardization has been extended to accommodate new technology (LTE) as well as new RAN sharing scenario (e.g. sharing of CBC).

In the past there has always been the assumption that the network provider would also be a service provider.

In this presentation NEC highlight a new use case of RAN Sharing scenario triggered by the business case where there is a clear split between ownership and service providers. NEC also proposes a list of change that would be necessary for the standard specification to accommodate this new scenario.

Discussion

Currently, following scenarios have been considered when specifying the RAN sharing feature:
    Sharing only ran nodes
        With common or split frequencies
    Sharing EPC as well as RAN nodes
        With common or split frequencies
    In the above case, it is assumed that the service providers/operators will only share the resources.

The current standard mechanisms will also accommodate/cover the case where the Service provider/operator will integrate their business processes (as T-Mobile and Orange have done in UK).

However, the current downturn economic situation, trends and drivers hinting to potential opportunities, the difficulty for some operators to capitalize has led to a new RAN scenario where the owner of the network is not a service provider. In this case, each service provider will buy a share of the network (formalized in a license agreement) based on their holding in the spectrum asset.

A use case of this scenario is what has happened in Russia where the country's major network operators—MTS, VimpelCom (Beeline), Megafon and Rostelekom—will see Yota become their LTE network provider and guarantee the roll out of its LTE network.

In such a scenario it is important that the standard has all the means to:
    Guarantee a fair usage of network resources according to their share acquired//granted
    Monitoring that the network is performing according to what was sold them
    Make sure that existing 3GPP features also accommodate this scenario In order to secure a fair usage of the network and allow network to be monitored per PLMN id, it is important that the PM counters which are specified in are defined per PLMN id. Here are some examples:
    Counters useful for the planning and network re-dimension
        These are counters related to RRC Connection (Request, re-establishment) and E-RAB related procedure (Setup, Release and modify)
    Counters related to the resource utilization
        These are counters related to the PRB usage, RACH usage, throughput related measurements (on IP layer as well as PDCP), active UE measurements
    Counters useful for optimization activity
        These are counters related to the handover procedure (Intra frequency, inter frequency, inter RAT etc.)

In addition, NEC believes that some of the existing 3GPP features to be enhanced to accommodate this case as well (reasoning is given below).

NNSF (NAS Node Selection Function)

The NNSF, among other functions, foresees that the eNB routes UEs attaching to the network (i.e. GUMMEI not available) based on the EPC capacity. The EPC capacity is informed by the MME to the eNB via Relative MME Capacity IE in S1 SETUP RESPONSE. If the EPC capacity is shared among different service providers, the eNB should be aware of the MME Capacity per PLMN. Thus there should be a Relative MME Capacity IE per PLMN.

MME Overload

In case of GWCN, the MME Overload procedure needs to be enhanced so that MME can indicate to the eNB that the traffic of a particular PLMN should be rejected.

This for example would be the case when PLMN 1 and PLMN 2 have a 50-50 split of the EPC and the MME reaches a high processing load and thus triggers the MME Overload procedure. In case the PLMN 1 is using most of the resources in MME, then MME should indicate to the eNB that user requests belonging to PLMN 1 should be the ones to be rejected.

If the situation then changes such that both PLMN are equally using the EPC resources, then MME could indicate both PLMNs in the new MME Overload message In order to do that, a list of requesting PLMN id IE should be added in the MME Overload Start and MME Overload Stop.

X2 Load Balancing

In order to understand why and how to enhance the load balancing related procedure, two use cases have been highlighted below:

Scenario 1:
  Cell 1: 50% loaded
    PLMN1 contribute on the load with 50%
    PLMN2 contribute on the load with 0%
  Cell 2: 80% loaded
    PLMN1 contribute on the load with 30%
    PLMN2 contribute on the load with 50%

In such a scenario there is clear an unbalance usage of the resources from the 2 PLMNs. The enhanced Load Balancing should work as follow:
  Cell 1 and cell 2 will exchange info on their load per PLMN id
  Cell 2 will start load balancing i.e.:
    Offload UEs of PLMN 2 in cell 2 to cell 1 (i.e. reduce HO trigger). In this case load in cell 2 is reduced trough offloading
    Propose cell 1 to delay HO of PLMN 2 (i.e. increase ho trigger). In this case cell 2 make sure that the HO of PLMN2 incoming UEs is delayed Scenario 2:
  Cell 1: 50% loaded
  PLMN1: contributes on cell load with 50%
  PLMN 2: contributes on cell load with 0%
  Cell 2
  50% loaded
  PLMN1 contributes on cell load with 25%
  PLMN 2 contributes on cell load with 25%

The 2 cells have same load and according to existing algorithm there would be no Load balancing actions. However if the HO trigger is per PLMN, then LB actions could be:
  Offloading PLMN1 UEs from cell 1 to cell 2 (i.e. reducing ho trigger for PLMN1 from cell 1 to cell 2)
  Signal this via Mobility Change Request and propose cell 2 to delay HO of PLMN1 UEs towards cell 1 (i.e. increase HO trigger from cell 2 to cell 1 of PLMN1 UEs)
  Delay HO of PLMN 2 Ues from cell 1 to cell 2
  Signal this via Mobility Change Request and propose cell 2 to advance HO of PLMN 2 UEs towards cell 1 (i.e. reduce ho trigger from cell 2 to cell1 of PLMN 2 UEs)

To recap, in order to have a load balancing working per PLMN, there would be a need for eNBs to know the capacity of each neighbors per PLMN (currently only the total cell BW is exchanged in X2 Setup). The eNBs should be exchange the info on their resource status on a PLMN granularity and finally the action (i.e. change of the HO trigger) should also be performed on a PLMN granularity. Accordingly, following changes would be needed:
  Change in X2 Setup/eNB Configuration Update
    Adding PRB usage/available capacity IE per PLMN id in both Request and Response message
  Change in Resources Status Request/Report
    Adding requesting PLMN IE in Resource Status Request
    Adding reporting PLMN IE in Resource Status Report
  Change in Mobility Change Request procedure
    Adding PLMN id to inform the node/cell less loaded to delay the handover of UEs of a certain PLMN (i.e. the PLMN which is using most of the resources of the overloaded eNB)

RR Impacts

The eNB should be able to monitor the resources used by each PLMN against their granted ones. It should be possible to control the rate of incoming connection requests independently for each PLMN. For example, when one PLMN has reached the maximum granted resources, eNB may block further connection requests from UEs belonging to that PLMN. In order to do that, the ac-BarringInfo IE in SIB 2 (system information block 2) should be set per PLMN. Using PLMN specific Access Class barring parameters, e.g. ac-BarringFactor or ac-BarringTime, the eNB can manage the rate of incoming connection requests independently for each PLMN.

CONCLUSION

In this paper has analysed a new RAN sharing scenario where there is a separation between network ownership and service provider and has proposed following changes in the standard in order to accommodate this scenario:
  New PM counters as listed in slide should be added in 32.425
  S1 SETUP RESPONSE
    Relative MME Capacity IE should be defined per PLMN
  MME Overload Start
    Adding Requesting PLMN id
  MME Overload Stop
    Adding Requesting PLMN id
  X2 Setup Request
    Adding PRB usage/available capacity IE per PLMN
  X2 Setup Response
    Adding PRB usage/available capacity IE per PLMN
  Configuration Request
    Adding PRB usage/available capacity IE per PLMN
  Configuration Response
    Adding PRB usage/available capacity IE per PLMN
  Resources Status Request/Report
    Adding requesting PLMN IE Resources Status Request/Report
  Adding reporting PLMN IE
Mobility Change Request
  Adding HO trigger per PLMN id
RRC SysteminformationBlockType2:
ac-BarringInfolac-BarringForMO-Data should be defined per PLMN.

It is proposed to discuss the contribution and agree on the changes propose in R3-111992.

This application is based upon and claims the benefit of priority from United Kingdom patent application No. 1108525.5, filed on May 20, 2011, the disclosure of which is incorporated herein in its entirety by reference.

The invention claimed is:

1. A User Equipment (UE) for a communication system comprising eNBs, for a radio access network (RAN) that supports RAN sharing by a plurality of operators, each operator being associated with a respective Public Land Mobile Network (PLMN) identity, the UE comprising:
   a transceiver circuit configured to receive a system information block 2 (SIB2) that includes an access class barring (ac-barring) per PLMN list, the ac-barring per PLMN list comprising a plurality of ac-barring per PLMN entries, each ac-barring per PLMN entry comprising an indication of a PLMN of at least one said operator and, for each indicated PLMN, an ac-BarringInfo information element (IE) with an associated mobile originating data (ac-BarringForMO-Data) IE.

2. A method for a User Equipment (UE) that communicates in a communication system comprising eNBs, for a radio access network (RAN) that supports RAN sharing by a plurality of operators, each operator being associated with a respective Public Land Mobile Network (PLMN) identity, the method comprising:
   receiving a system information block 2 (SIB2) that includes an access class barring (ac-barring) per PLMN list, the ac-barring per PLMN list comprising a plurality of ac-barring per PLMN entries, each ac-barring per PLMN entry comprising an indication of a PLMN of at least one said operator and, for each indicated PLMN, an ac-BarringInfo information element (IE) with an associated mobile originating data (ac-BarringForMO-Data) IE.

3. An eNB for a radio access network (RAN) that supports RAN sharing by a plurality of operators, each operator being associated with a respective Public Land Mobile Network (PLMN) identity, the eNB comprising:
   a transceiver circuit configured to transmit a system information block 2 (SIB2) that includes an access class barring (ac-barring) per PLMN list, the ac-barring per PLMN list comprising a plurality of ac-barring per PLMN entries, each ac-barring per PLMN entry comprising an indication of a PLMN of at least one said operator and, for each indicated PLMN, an ac-BarringInfo information element (IE) with an associated mobile originating data (ac-BarringForMO-Data) IE.

4. A method for an eNB for a radio access network (RAN) that supports RAN sharing by a plurality of operators, each operator being associated with a respective Public Land Mobile Network (PLMN) identity, the method comprising:
   transmitting a system information block 2 (SIB2) that includes an access class barring (ac-barring) per PLMN list, the ac-barring per PLMN list comprising a plurality of ac-barring per PLMN entries, each ac-barring per PLMN entry comprising an indication of a PLMN of at least one said operator and, for each indicated PLMN, an ac-BarringInfo information element (IE) with an associated mobile originating data (ac-BarringForMO-Data) IE.

* * * * *